Patented Aug. 4, 1931

1,816,822

UNITED STATES PATENT OFFICE

HARRY A. BELL, OF CHICAGO, ILLINOIS, ASSIGNOR TO THE MECHANICAL RUBBER COMPANY, OF CHICAGO, ILLINOIS, A CORPORATION OF NEW JERSEY

METHOD OF MAKING FLOOR COVERINGS

No Drawing. Application filed June 15, 1927. Serial No. 199,136.

This invention relates to the method of manufacturing flooring or wall covering and to the article produced thereby. More particularly it relates to an improved method of manufacturing a mottled or variegated flooring of rubber composition and its product.

It has been customary in manufacturing mottled flooring out of rubber composition, to incorporate a small amount of variously colored unvulcanized rubber composition which is to constitute the dispersed portion into a relatively greater amount of differently colored unvulcanized rubber composition which is to constitute the base or body portion of the flooring. These compositions are intermixed and sheeted to obtain a mottled sheet of material in which the colored dispersed composition appears as elongated veins.

It is an object of this invention to provide a method of forming a variegated flooring of rubber composition by which the dispersed composition or filler is interspersed in the body composition in lumps without the appearance of veining. The invention also comprises the article produced.

In the preferred embodiment of the invention a rubber composition is prepared of suitable ingredients to constitute the base or body portion of the flooring. A suitable composition is as follows:

| | Parts by weight |
|---|---|
| Rubber | 25 |
| Zinc oxide | 30 |
| Clay | 15 |
| Iron oxide | 7 |
| Sulphur | 5 |
| Reclaimed rubber | 20 |
| Lime | 2 |

These ingredients are intermixed upon a mill or by any other suitable means. In the composition described, the lime serves as an accelerator of vulcanization and the iron oxide serves as a coloring agent. The clay and zinc oxide function generally as fillers. A composition of this sort has a generally brown color. Various other coloring agents can be substituted for the iron oxide such as earthy pigments, metallic oxides or sulphides or vegetable coloring matters which will yield a composition having the particular color desired.

One or more vulcanized rubber compositions of a nature suitable to be dispersed in the base stock are prepared. These compositions can be made of the same materials as are used in forming the body portion using various other coloring agents than are in the body composition. For example, the color desired may be black, green, blue or various other colors and the coloring agents can be carbon black, ultra marine blue, etc. Each of the filler compositions prepared should be vulcanized and a suitable time and temperature for the materials given is 25 minutes at 60 lbs. pressure.

The vulcanized rubber compositions which are to constitute the dispersed material are broken up into small pieces in any suitable way as by grinding upon a mill. The rolls of the mill and the time of grinding are regulated so that the stock is broken into pieces, the majority of which are preferably approximately one quarter of an inch in diameter. The ground vulcanized rubber composition now should be screened to eliminate the dust and the large pieces should be removed leaving the composition in such form that it can be incorporated into the base material to form a compound of the general appearance of terrazzo flooring.

Before incorporating the filler stock into the base composition, the base composition is warmed upon a mixing mill. The ground vulcanized material in one or more colors different from that of the base material is then intermixed therewith in various proportions, a suitable formula being one part of cured stock to two parts of the uncured base portion. The materials are mixed together until the vulcanized rubber composition is dispersed throughout the unvulcanized base material in small sized lumps. It is characteristic of the mixture that the vulcanized rubber does not flow throughout the base material to cause the appearance of veining.

After intermixing the materials the resulting compound is calendered to the desired thickness and is then placed in a suitable press and subjected to a semi-cure, a suitable time and pressure for vulcanization of the composition described being ten minutes at sixty pounds pressure. The semi-cured sheets can now be cut into blocks of the desired size to constitute tiling. During the semi-cure the dispersed lumps of material become covered at the surface of the sheet by reason of the flow of the unvulcanized composition around them. In order to bring the dispersed lumps of material to the surface of the blocks, the face of each block is sanded or buffed, cutting back the outer surface of rubber composition. The blocks are then vulcanized under pressure in order to obtain a tile having the glazed, glossy finish known as "plate" finish. Vulcanization is suitably effected for the compounds described by heating for ten minutes at sixty pounds pressure. The blocks obtained by this procedure have a smooth glossy surface which is desirable in tile flooring and has the variegated appearance of terrazzo flooring.

In case the "plate" finish is not desired in the completed article, the sheet composition can be completely vulcanized before the sanding or buffing operation. Vulcanization with the materials described is suitably effected at sixty pounds pressure for twenty-five minutes, the time and temperature being varied with the composition used. It may be desired to provide a cushion backing for the flooring and in such case a composition suitable for use as a backing can be prepared having the following ingredients:

|  | Parts by weight |
|---|---|
| Rubber | 5 |
| Reclaimed rubber | 55 |
| Whiting | 30 |
| Sulphur | 7 |
| Lime | 1 |
| Palm oil | 2 |

These materials are intermixed on a mill or by any other suitable device. In this composition the palm oil serves as a softening agent; the lime acts as an accelerator of vulcanization; and the whiting serves both as a coloring agent and filler. The composition can be varied as may be desired. After the materials are intermixed, the compound is sheeted and can be calendered into place upon the mixed flooring composition before the latter has been vulcanized. The procedure of semi-curing, buffing and completely curing is the same as that described for the flooring without the backing.

While the invention has been described as applied to the manufacture of tiles for flooring or wall covering, it is contemplated to use the composition for the manufacture of long sheets. The ingredients and their proportions can be varied within wide limits according to the appearance sought in the completed article. The backing applied to the flooring can be made of other materials than rubber, such for example as fabric, etc.

Having thus described my invention what I claim and desire to protect by Letters Patent is:—

1. The method of manufacturing flooring which comprises grinding vulcanized rubber composition into lumps, intermixing unvulcanized rubber composition with a quantity of the differently colored lumps of the vulcanized rubber composition to form a conglomerate mass containing vulcanized rubber composition dispersed through the unvulcanized rubber composition, sheeting the mass, semi-curing the sheet, abrading away the surface of the sheet, and completing the vulcanization of the sheet under pressure.

2. The method of manufacturing flooring which comprises grinding vulcanized rubber composition into lumps, intermixing unvulcanized rubber composition with a quantity of the differently colored lumps of the vulcanized rubber composition to form a conglomerate mass containing vulcanized rubber composition dispersed through the unvulcanized rubber composition, sheeting the mass, semi-curing the sheet, abrading away the surface of the sheet, completing the vulcanization of the sheet under pressure, and applying a backing to the vulcanized sheet.

Signed at Chicago, county of Cook, State of Illinois, this 15th day of March, 1927.

HARRY A. BELL.